Sept. 22, 1925.
C. G. OLSON
1,554,646
GEAR TESTING MACHINE
Filed Nov. 10, 1919
3 Sheets-Sheet 1
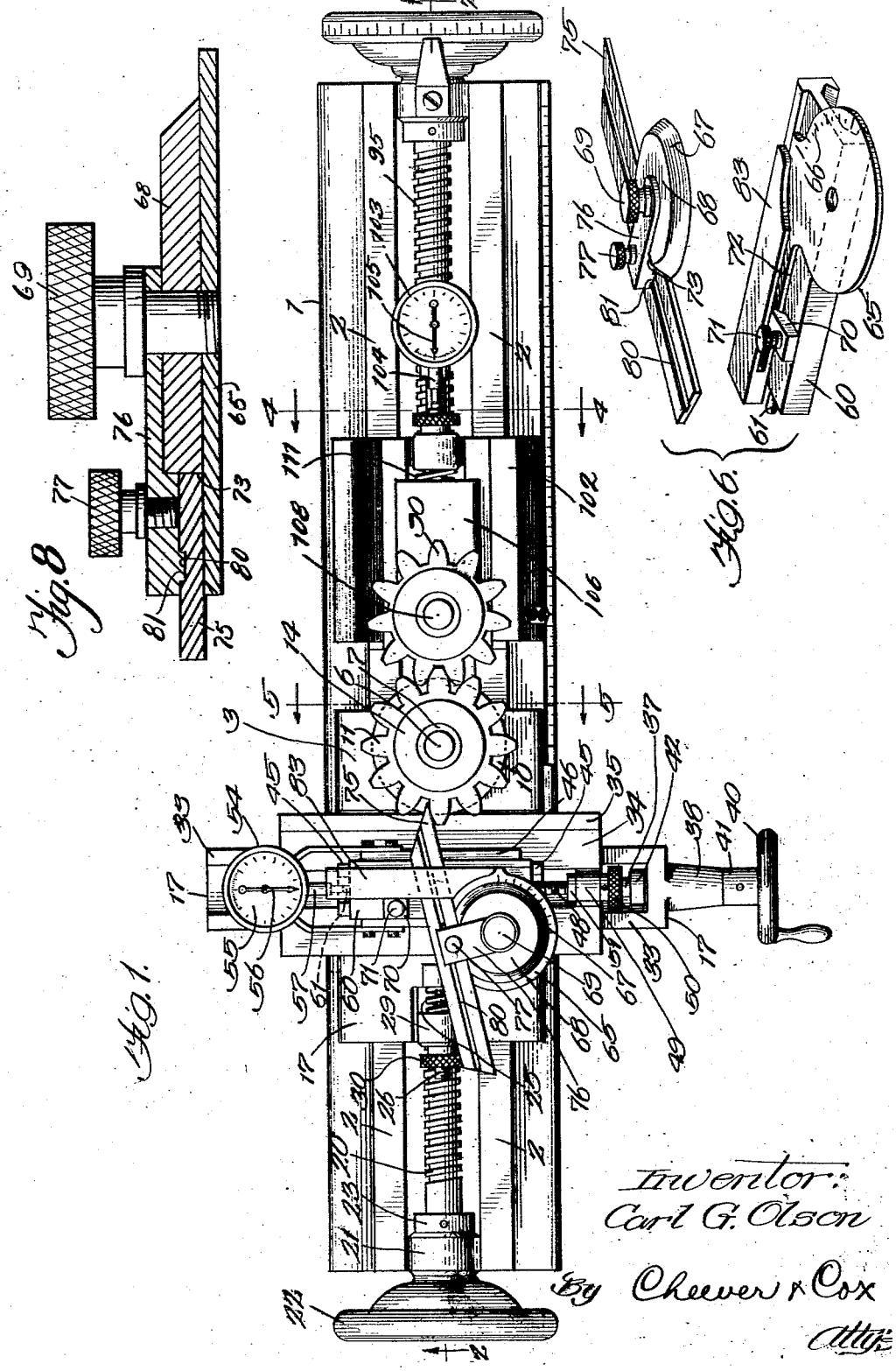
Inventor:
Carl G. Olson
By Cheever & Cox
Attÿ

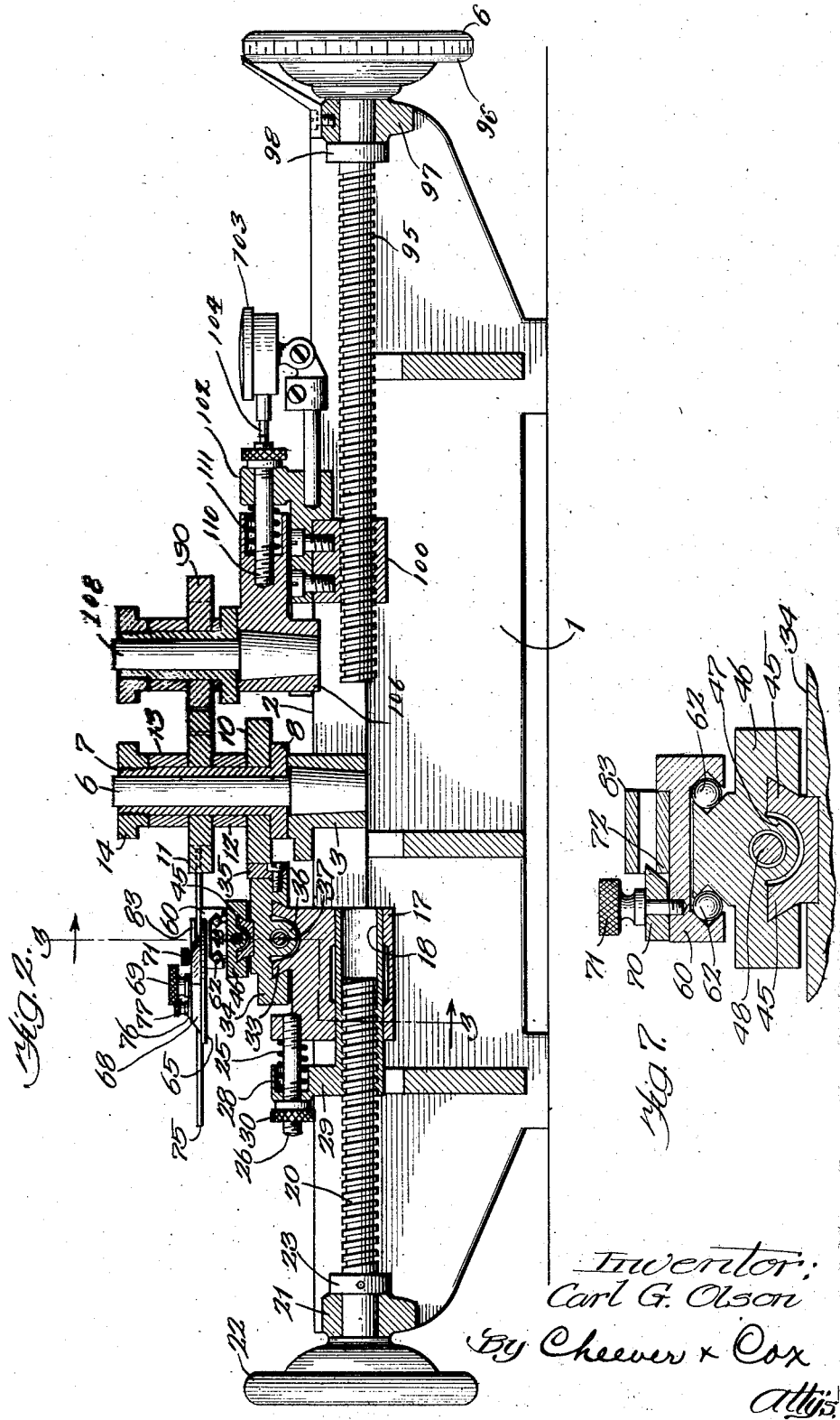

Sept. 22, 1925.
C. G. OLSON
1,554,646
GEAR TESTING MACHINE
Filed Nov. 10, 1919
3 Sheets-Sheet 3
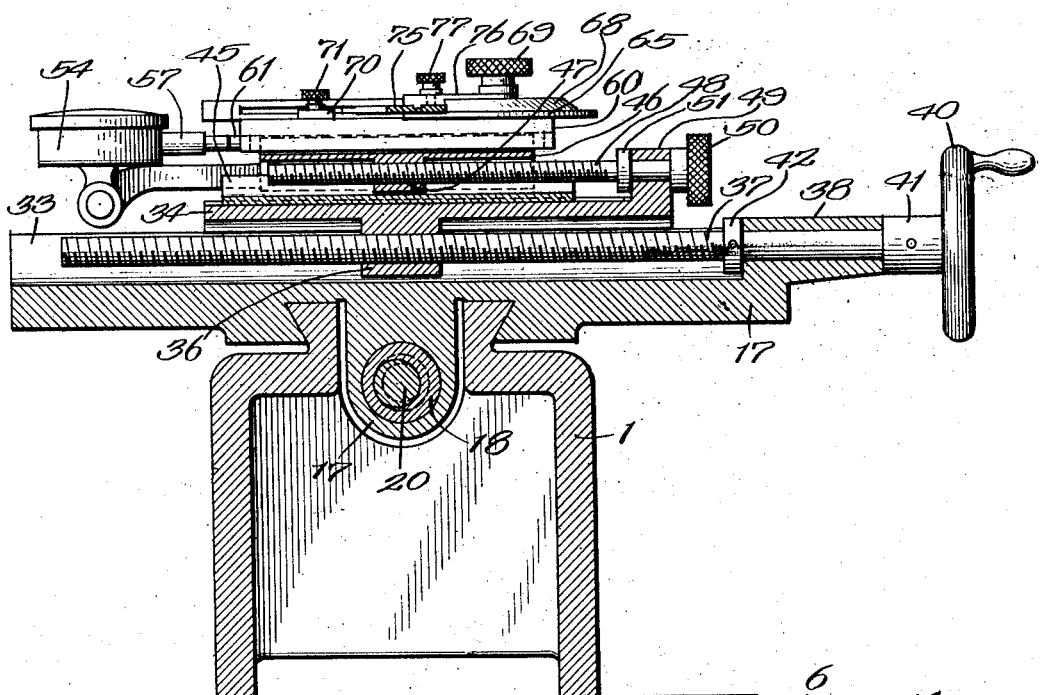
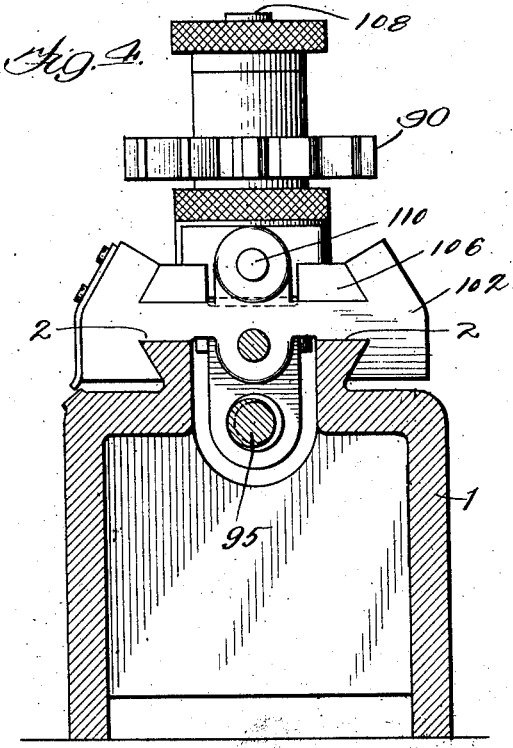
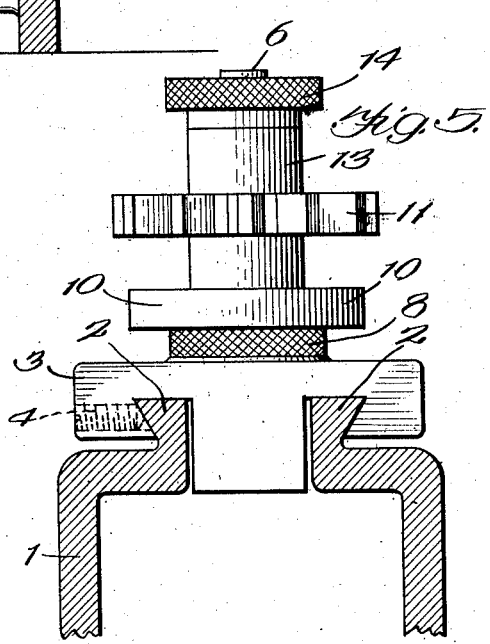
Inventor:
Carl G. Olson
By Cheever & Cox
Attys.

Patented Sept. 22, 1925.

1,554,646

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

GEAR-TESTING MACHINE.

Application filed November 10, 1919. Serial No. 336,928.

*To all whom it may concern:*

Be it known that I, CARL G. OLSON, a citizen of the United States, residing at Chicago, in the county of Cook and State of Illinois, have invented a certain new and useful Improvement in Gear-Testing Machines, of which the following is a specification.

My invention relates to gear testing machines especially for the testing of the teeth of involute gears. One object of the invention is to provide means for testing the accuracy of configuration of the gear teeth. A patent showing a machine for an analogous purpose was granted to me May 27, 1919, No. 1,304,592. Another object of my invention is to provide means for readily determining the "pressure angle" of the teeth.

I obtain my objects by the mechanism illustrated in the accompanying drawings, in which—

Figure 1 is a top plan view of the complete machine.

Figure 2 is a longitudinal sectional elevation on the line 2—2, Figure 1.

Figure 3 is a sectional elevation on the line 3—3, Figure 2.

Figure 4 is a sectional elevation on the line 4—4, Figure 1.

Figure 5 is a sectional elevation on the line 5—5, Figure 1.

Figure 6 is a perspective view of the component parts of the protractor and contact arm.

Figure 7 is a sectional view taken crosswise of the testing carriage.

Figure 8 is a vertical sectional detail view taken crosswise of the contact arm of the protractor.

Like numerals denote like parts thruout the several views.

In the form selected to illustrate the invention the machine has a main frame 1 having a pair of longitudinal guides 2, 2. At one point said guides support a socket member 3 which is rigidly held in proper position on the guides by means of a set screw 4 as shown in Figure 5. The socket member receives and supports the lower conical end of a stationary upright arbor 6. Fitting over said arbor is a sleeve 7 having an annular flange 8 at its lower end. This sleeve rests upon the socket member and is freely rotatable upon the arbor as an axis. Encircling the sleeve and resting upon the flange 8 is a disc or roller 10 having a diameter equal to the pitch diameter of the gear 11, to be tested. A spacing collar 12 surrounds sleeve 7 between disc 10 and the gear 11. A spacing collar 13 surrounds sleeve 7 above the gear 11. A knurled nut 14 screws upon the upper threaded end of sleeve 7 and when this is screwed down tight against the collar 13, it clamps the gear and the disc together so as to make them rotate as a unit.

Slidably mounted upon the guides 2 at one side of the socket member 3 is a carriage 17. For identification this may be termed the contact carriage as it keeps the straight edge or track in contact with the pitch circle disc as will be presently understood. This is longitudinally bored to slidingly receive and guide an internally threaded sleeve 18 which extends parallel to guides 2. An adjusting screw 20 screws into said sleeve. Said screw is journaled in a stationary bearing 21 which forms a part of the main frame. A hand wheel 22 is fastened to said screw in position to abut the outer end of bearing 21. A collar 23 is rigidly fastened to the screw in position to abut the inner end of said bearing. The result is that by rotating the hand wheel in one direction or the other the sleeve 18 may be moved longitudinally of the machine and toward and from disc 10. The carriage 17 is slidable relatively to sleeve 18 and the carriage is constantly urged toward disc 10 by means of a helical compression spring 25 which encircles a stud 26, screwing into or otherwise rigidly fastened to the carriage. At one end the spring abuts the carriage and at the other end fits into and abuts the bottom of a socket 28 formed in an upstanding post 29 rising from the sleeve 18. The outer end of the stud 26 is threaded to take the nut 30 which abuts the outer end of post 29. By screwing this nut one way or the other the tension of spring 25 may be regulated. This nut consequently affords means for varying the pressure of the sleeve 18 against the carriage and in turn the pressure of the carriage toward the disc 10.

The said carriage 17, which travels longitudinally of the machine, has crossguides 33 which support a cross-carriage 34. For identification this may be called the operating carriage, as it is the one which the operator causes to travel back and forth in making the test. Said carriage has a straight edge or track 35 fastened to one side to make rolling contact with the disc 10. The carriage also has a nut 36 which takes an operating screw 37 journaled in a bearing 38 formed at the front of the longitudinally moving carriage 17, as shown in detail at the right end of Figure 3. This operating screw is rotated by means of a hand wheel 40 having a hub 41 which abuts the outer end of the bearing 38. A collar 42 is fastened to the screw in position to abut the inner end of the bearing. Thus by rotating the operating hand wheel 40 one way or the other the operating carriage 34 may be moved forward or backward across the main frame.

Carriage 34 is provided with guides 45 arranged parallel to the operating screw 37. These guides support the indicator carriage 46. This carriage has a nut 47 which takes an adjusting screw 48. Said screw is journaled in a bearing 49 formed at the front end of operating carriage 34. It is rotated by means of a knurled nut 50 which abuts the outer end of bearing 49. A collar 51 is fastened to the screw in position to abut the inner end of said bearing; consequently by rotating nut 50 in one direction or the other the indicator carriage 46 will be moved forward or backward crosswise of the machine. This movement is for bringing the indicator pointer to zero position when the contact arm is in contact with the gear to be tested, as will be explained.

The indicator carriage 46 carries an indicator 54 at its rear end. The indicator is provided with a dial 55 and pointer 56. The pointer is operated by means of a plunger 57 which is longitudinally movable in a line parallel to the axis of screw 48. The indicator 54 is what is commonly known as a "multiplying dial indicator"—an article which is known commercially. It is sufficient for the present purpose to say that the plunger 57 is geared to the pointer in such manner that when the plunger is pushed inward against the force of an internal cushion spring the pointer will rotate, thus indicating in an exaggerated degree the amount of movement of the plunger.

Mounted upon the indicator carriage is a testing carriage 60. This is mounted upon the indicator carriage 46 in such manner as to travel thereon in the direction of the length of the plunger 57. It has a contact finger 61 at its rear end which engages the end of the plunger 57. The testing carriage moves very freely, the frictional resistance being reduced to a minimum by balls 62 sliding in grooves in the indicator and testing carriages.

Fastened to the testing carriage is a protractor having a base plate 65 shown in perspective in Figure 6. This has a graduated scale 66 which co-operates with a pointer line 67 engraved in the beveled edge of a plate 68 which is rotatably mounted upon said base plate. The plates 65 and 68 are held assembled by a screw 69. Plate 65 is secured to the testing carriage 60 by means of a clip 70 held by a screw 71 in position to engage the arm 72 which forms an extension of said base plate. Plate 68 is not a complete disc but is segmented to produce a flat side 73 at the back. A contact arm 75 bears against the side 73 and the parts are held assembled by a tie bar 76. This is held to plate 68 by a screw 69 and to the contact arm 75 by a screw 77, as shown in perspective in Figure 6. Arm 75 has a longitudinal slot 80 which receives a rib 81 formed at the bottom of the rear end of bar 76. This permits the arm 75 to be adjusted longitudinally with reference to the upper protractor plate 68. These parts are shown in detail in Fig. 8. In order to brace the arm 75 and hold it down upon the extension 72 of plate 65 it is desirable to form a keeper arm 83 integral with arm 72, said keeper arm overlying the contact arm as best shown in Figure 1.

From the foregoing it will be seen that when the parts are thus assembled the contact arm 75 is rotatable in unison with protractor plate 68 about the axis of screw 69 and that the protractor parts and contact arm 75 are very freely movable as a unit towards and from the plunger 57 of the indicator 54.

The parts above described are the only ones concerned with my present invention. As built commercially however it is desirable to provide, in the same machine, means for otherwise testing the gear 11. For this purpose a correct gear 90 for testing purposes is held in mesh with gear 11. A screw 95 having a hand wheel 96 is journaled in a fixed bearing 97 in the machine frame and held against longitudinal movement by a collar 98 co-operating with the hub of said hand wheel. Said screw works in a nut 100 mounted on a test carriage 102 upon which is rigidly mounted a thrust indicator 103. This indicator has a spring backed plunger 104 which actuates the pointer 105 of the indicator. This plunger is engaged by a rod 110 rigidly fastened to a gear carrier 106, which is slidable on carriage 102. Said carrier has an upright arbor 108 on which gear 90 is rotatably mounted. Rod 110 slides in carriage 102 and a compression spring 111 is interposed between the carriage and gear carrier 106. When the gears 11 and 90 are rotated while in mesh, if the teeth of the gear 11 are out of true they will permit the testing gear 90 to approach more nearly to the center of gear 11, or will force gear 90 further away from the center of gear 11 and this movement of gear 90 will cause rod 110 to slide in carriage 102 and move the plunger 104 of the indicator in or out, as the case may be, and produce a corresponding movement of the pointer.

Operation: As previously pointed out, the principal object of the present invention is to provide facile means for discovering the pressure angle of an involute toothed gear wheel and to test the accuracy of configuration of the teeth. For this purpose the gear wheel 11 is rigidly clamped to the disc 10 so that the two rotate as a single piece about the arbor 6. Next, the hand wheel 22 is manipulated in such manner as to bring the track 35 into contact with the disc 10. The pressure of the track against the disc will be a yielding one on account of the presence of the springs 25. Another preliminary is to angularly position the upper protractor plate 68 and with it the contact arm 75. Frequently, when gears are sent in to be tested, their pressure angle is not known. In such case the operator estimates or guesses at the angle and adjusts the upper protractor plate and contact arm accordingly. Fourteen and a half degrees is a common angle and the operator would probably try this first. The operator then brings the contact arm 75 into contact with the side of a gear tooth, as shown in Figure 1, and while keeping it there manipulates the screw 48 in such manner as to bring the indicator pointer to zero position. The indicator plunger, backed up by the spring within the indicator, pushes against the finger 61 on the testing carriage and this keeps the contact arm in contact with the gear tooth under substantially uniform pressure.

The machine is now set ready to make the test. The actual test is made by slowly rotating the hand wheel 40 back and forth and observing the position of the pointer. This movement of the operating carriage 34 and track 35 causes the disc 10 to rotate and to produce a corresponding rotation of the gear wheel 11. Now, according to the properties of involute gears, if the contact arm 75 has been set at the proper pressure angle and the gear teeth are accurately configurated, the engaged gear tooth will cause the contact arm to travel at the same rate as the track 35. As the indicator carriage 46 is fixed relatively to the operating carriage 34, there should be no relative movement between the latter and the testing carriage 60. In such case, the pointer will remain at zero. But if the pointer does move, showing that there is such relative movement then the operator knows either that the contact arm is not set at the correct pressure angle or that the gear tooth is imperfect, or both. By testing several teeth he will soon be able to determine whether the movement of the indicator pointer results from improper setting of the contact arm or improper configuration of the tooth. By the cut and try method, he will soon be able to determine what the pressure angle is and when this has once been determined and the arm has been set correctly at that angle each individual tooth may be tested in the same manner and the inaccuracies, if any, may be observed.

By reference to my said prior patent, it will be seen that according to the particular design there shown, the contact arm or contactor has a ball shaped head which makes "point contact," so to speak, with the gear tooth. Such a construction is capable of showing the aberration, but does not afford direct means for determining the pressure angle of the tooth. In the form shown in the present case, the contactor 75 has a straight edge for contacting the side of the tooth. It is therefore analogous to the acting half of a rack tooth. Rack teeth for involute gears are, of course, straight sided, and the angle of inclination of the side of the rack tooth constitutes the pressure angle. The acting side of the contactor in my present case therefore forms an analogue of the acting side of a rack tooth and hence by changing the angle of the contactor until a perfect gear tooth will cause no movement of the indicator pointer, the pressure angle of the tooth may be found.

Having thus described my invention what I claim as new and desire to secure by Letters Patent, is:

1. A gear tester having a track, a roller adapted to rotate in contact with said track, means for causing the gear to be tested to rotate in unison with the roller, a contactor, means whereby the contactor is supported by the track for angular and longitudinal bodily movement relative to the track, and means for detecting relative movement between the contactor and the track, the contactor having a straight edge for engaging the side of the tooth to be tested, whereby if the contactor be not set at the true pressure angle a relaive movement between the contactor and the track will occur even tho the tooth be accurately configurated, thus enabling the operator to determine the pressure angle of the gear teeth.

2. A gear tester having a track, a roller adapted to rotate in contact with said track, means for causing the gear to be tested to rotate in unison with the roller, a contactor having a straight edge for engaging the side of the tooth to be tested, connections between the contactor and the track adapted to permit relative movement between them, means for indicating such relative movement, and means for enabling the angle of the contactor relative to the track to be varied.

3. A gear tester having a support for the gear to be tested, a contactor provided with a straight edge for engaging the side of a tooth of a gear on said support, a carriage for supporting said contactor, said contactor being angularly adjustable relatively to the carriage, a support for said said carriage provided with a track, a roller on the gear support adapted to cooperate with said track, means for securing the roller to the gear to be tested whereby the two will rotate in unison, and means for indicating relative movement between the contactor and the track.

4. A gear tester having a support for the gear to be tested, a protractor including two relatively rotatable parts, a contactor rotating in unison with one of the protractor parts, a carriage for supporting the other protractor part, a support for said carriage, said support having a track movable in unison with it, a roller on the gear support adapted to cooperate with said track, and means for securing the gear to be tested to the roller whereby the two rotate in unison, said means being adapted to hold said gear in engagement with the contactor.

5. A gear tester having a support for the gear to be tested, a protractor including two relatively rotatable parts, a contactor rotating in unison with one of the protractor parts, a carriage for supporting the other protractor part, said protractor having a straight edge adapted to engage the side of a tooth of a gear on said support, a support for said carriage having a track movable in unison with it, a roller on the gear support adapted to rotate in contact with said track, clamping means for causing the gear to rotate in unison with the roller, and means for indicating the relative movement between the contactor and the track lengthwise of the track.

6. A gear tester having a support for the gear to be tested, a contactor provided with a straight edge for engaging the side of a tooth of a gear on said support, a carriage for supporting said contactor, said contactor being angularly adjustable relatively to the carriage, a support for said carriage provided with a track, a roller on the gear support adapted to cooperate with said track, means for securing the roller to the gear to be tested whereby the two will rotate in unison, an indicator secured to said support, said indicator having a pointer and a plunger whereby it is actuated, said plunger being adapted to engage said carriage and urge it in a direction tending to hold the contactor in engagement with the tooth to be tested.

7. A gear tester having a support for the gear to be tested, a contactor provided with a straight edge for engaging the side of a tooth of a gear on said support, a carriage for supporting said contactor, said contactor being angularly adjustable relatively to the carriage, a support for said carriage provided with a track, a roller on the gear support adapted to cooperate with said track, means for securing the roller to the gear to be tested whereby the two will rotate in unison, means for indicating relative movement between the contactor and the track, and means for pressing the track and roller towards each other.

8. A gear tester having a roller and means for fastening to it the gear to be tested, a support for the gear and roller, a track adapted to cooperate with the roller, an operating carriage whereto the track is secured, a support for said carriage, a screw adapted to move the carriage in the direction of the length of the track, an indicator movable in unison with the carriage, a contactor having a straight edge for engaging the side of a tooth of a gear on the gear support, and a testing carriage whereto the indicator is fastened, said testing carriage being adapted to actuate the indicator, and being supported on the operating carriage and movable relatively to the indicator in the direction of the length of the track.

9. A gear tester having a roller and means for fastening to it the gear to be tested, a support for the gear and roller, a track adapted to cooperate with the roller, an operating carriage whereto the track is secured, a support for said carriage, a screw adapted to move the carriage in the direction of the length of the track, an indicator movable in unison with the carriage, a contactor having a straight edge for engaging the side of a tooth of a gear on the gear support, a testing carriage whereto the indicator is fastened, said testing carriage being adapted to actuate the indicator and being supported on the operating carriage and movable relatively to the indicator in the direction of the length of the track, and means for regulating the pressure of the track and roller toward each other.

10. A gear tester having a roller adapted to rotate in unison with the gear to be tested, a support for the gear and roller, a track adapted to cooperate with the roller, an operating carriage for producing relative movement between the roller and the track, an indicator carriage mounted on the operating carriage, an indicator secured to the indicator carriage, a testing carriage mounted on the indicator carriage, and a contactor secured to the testing carriage, the testing carriage being adapted to operate the indicator and the indicator carriage being adjustable relatively to the operating carriage whereby the indicator may be brought to zero position when the contactor is in engagement with the tooth to be tested.

11. A machine for testing gears having involute teeth, said machine having means for rotatably supporting the gear to be tested, two carriages movable parallel to each other and parallel to a plane tangential to the pitch cylinder of the gear on said supporting means, a straight edge contactor on one of said carriages for making rolling contact with a tooth of the gear on said supporting means, means for moving the other carriage and rotating the gear in predetermined ratio, having regard to the linear velocity of the gear at the pitch circle, and means for indicating any relative movement of the carriages.

12. A machine for testing gears having involute teeth, said machine having means for rotatably supporting the gear to be tested, two carriages movable parallel to each other and parallel to a plane tangential to the pitch cylinder of the gear on said support, a straight edge contactor on one of said carriages, means for yieldingly holding said contractor in engagement with a tooth of said gear, means for rotating the gear and moving the other carriage tangentially to it in predetermined ratio, and means for indicating any relative movement of the carriages.

13. A machine for testing gears having involute teeth, said machine having means for rotatably supporting the gear to be tested, a straight edge contactor for rolling upon a tooth of a gear on said supporting means, two carriages movable parallel to each other and parallel to the pitch cylinder of the gear to be tested, the first carriage supporting the contactor, and the second carriage supporting the first carriage, means for moving the second carriage and rotating the gear so that the speed of the second carriage is the same as the linear speed of the pitch circle of the gear, and means for indicating any relative movement of said carriages.

14. A machine for testing gears having involute teeth, said machine having means for rotatably supporting the gears to be tested, a straight edge contactor for rolling upon a tooth of the gear upon said supporting means a carriage on which said contactor is mounted, said carriage being movable parallel to a plane tangential to the pitch cylinder of the gear, a second carriage movable parallel to the first one for supporting it, means for moving the second carriage and rotating the gear so that the speed of the second carriage is the same as the linear speed of the pitch circle of the gear, means for indicating any relative movement of said carriages, a third carriage movable at right angles to the others for supporting them, and means for yieldingly urging the third carriage toward the gear to thereby maintain pressure contact between the contactor and the gear tooth.

15. A machine for testing gears having involute teeth, said machine having means for rotatively supporting the gear to be tested, a straight edge contactor for engaging a tooth of the gear upon said supporting means, said contactor being bodily movable in a direction parallel to a plane tangential to the pitch cylinder of the gear on said supporting means, and being adapted to be moved by the gear tooth, means for rotating the gear while the tooth is in contact with the contactor, and means for indicating whether or not the contactor has been moved linearly an amount equal to the arcuate movement of the gear at the pitch line.

16. A machine for testing gears having involute teeth, said machine having means for rotatively supporting the gear to be tested, a straight edge contactor for engaging a tooth of the gear upon the gear supporting means at different points along the tooth curve, a support for said contactor movable parallel to a plane tangential to the pitch cylinder of the gear upon said gear supporting means, a carriage on which said support is mounted, said carriage being movable in the same direction as said support, means for rotating the gear a definite amount, and means for moving the carriage an amount corresponding to the angular movement of the gear and means for indicating the relative movement, if any, between the carriage and the support to thereby indicate the departure, if any, of the tooth form from the form that it should have.

17. A machine for testing gears having involute teeth, said machine having means for rotatably supporting the gears to be tested, a straight edge contactor for rolling upon a tooth of the gear upon the gear supporting means, a carriage on which said contactor is mounted, said carriage being movable parallel to a plane tangential to the pitch cylinder of the gear, a second carriage movable parallel to the first one for supporting it, means for moving the second carriage and rotating the gear so that the speed of the second carriage is the same as the linear speed of the pitch circle of the gear, means for indicating any relative movement of said carriages, a third carriage movable at right angles to the others for supporting them, means for yieldingly urging the third carriage toward the gear to thereby maintain pressure contact between the contactor and the gear tooth, and means whereby the contactor may be held at various angles on the first mentioned carriage.

In witness whereof, I have hereunto subscribed my name.

CARL G. OLSON.